United States Patent [19]

Kanamaru et al.

[11] Patent Number: 4,783,898
[45] Date of Patent: Nov. 15, 1988

[54] METHOD OF PRODUCING A SHAFT HAVING PLATE-LIKE MEMBER JOINED THERETO

[75] Inventors: Hisanobu Kanamaru, Katsuta; Yoshimi Sugaya, Funabashi, both of Japan

[73] Assignee: Hitachi, Ltd., Tokyo, Japan

[21] Appl. No.: 75,938

[22] Filed: Jul. 22, 1987

[30] Foreign Application Priority Data

Jul. 25, 1986 [JP] Japan ................ 61-173656

[51] Int. Cl.$^4$ ............................. B21D 39/00
[52] U.S. Cl. ................... 29/523; 29/522.1; 419/8
[58] Field of Search ............... 29/522 R, 523; 419/8

[56] References Cited

U.S. PATENT DOCUMENTS 4,236,923 12/1980 Takahashi et al. ............ 419/6
4,438,555 3/1984 Tsumuki et al. ............ 29/509 X
4,616,389 10/1986 Slee ........................ 29/156.4 R

FOREIGN PATENT DOCUMENTS 54-86456 7/1979 Japan .
54-102209 8/1979 Japan .
59-176407 10/1984 Japan .
60-151459 8/1985 Japan .
60-152665 8/1985 Japan .

Primary Examiner—Timothy V. Eley
Assistant Examiner—Frances Chun
Attorney, Agent, or Firm—Antonelli, Terry & Wands

[57] ABSTRACT

A method of producing a shaft having plate-like member joined thereto comprises the steps of forming a through hole in the plate-like member, forming an annular groove in the inner surface of the through hole of the member, making the surface of the annular groove rugged by knurling, forming an annular projection on a shaft the outer diameter of the annular projection being substantially equal to or slightly smaller than the inner diameter of the through hole of the plate-like member inserting the shaft into the through hole of the plate-like member so that the annular groove is positioned between both sides of the annular projection supporting the side of the plate-like member and an end portion of the shaft and pressing substantially the whole of the side face of the annular projection of the shaft so that a part of the annular projection of the shaft plastically deforms and flows into the annular groove of the plate-like member, whereby the plate-like member is rigidly joined to the shaft. The plate-like member may be cam piece.

11 Claims, 4 Drawing Sheets

METHOD OF PRODUCING A SHAFT HAVING PLATE-LIKE MEMBER JOINED THERETO

BACKGROUND OF THE INVENTION

This invention relates to a method of producing a shaft having plate-like members joined thereto and, more particularly, to a cam shaft for driving valves of an internal combustion engine, which cam is made of hard material excellent in wear resistance and which shaft is rigid and lightened in weight.

As a conventional method of lightening the weight of a cam shaft and improving the wear resistance of the cam, a method of joining a pipe made of steel and other parts by brazing is disclosed in Japanese Patent Laid-Open No. 54-86456. According to this method, both parts constituting the cam shaft and jigs made of refractory material are inserted in a high-temperature atmosphere furnace to join the parts by brazing, so that large equipment therefore is necessary, and the method is poor in workability and is not conducted economically.

A method of joining a cam and a hollow shaft by inserting the hollow shaft of steel in a cam and expanding the hollow shaft is disclosed in Japanese Patent Laid-Open No. 60-151459. According to this method, stresses are applied over the whole of the hollow shaft, so that there is a fear that the cam is broken. Further, precision, particularly, rectangularity and parallelity after joining the cam and the shaft and positional precision of the cam relative to the shaft are not sufficient. Japanese Patent Laid-Open Nos. 60-152665 and 59-176407 are relevant to this kind of art.

Further, there is Japanese Patent Laid-Open No. 54-102209 in which a cam is made of wear-resistant iron base sintering alloy, and the cam is joined to a shaft by a material of liquid phase produced by the sintering alloy. According to this method, the cam is assembled to the shaft in a high-temperature atmosphere, so that precision of the assembled cam and shaft is not sufficient.

SUMMARY OF THE INVENTION

An object of the present invention is to solve the above-mentioned problems of the prior arts and to provide a method of producing a shaft having plate-like members joined thereto such as a cam shaft in which cam pieces excellent in wear-resistance, high in rigidity and capable of weight lightening are joined to a shaft with high precision.

The present invention resides in a method of producing a shaft having plate-like member joined thereto comprising the steps of; forming a through hole in the plate-like member; forming an annular groove in the inner surface of the through hole of the member; making the surface of the annular groove rugged by knurling, for example; forming an annular projection on a shaft, the outer diameter of the annular projection being substantially equal to or slightly smaller than the inner diameter of the through hole of the plate-like member; inserting the shaft into the through hole of the plate-like member so that the annular groove is positioned between both sides of the annular projection; supporting the side of the plate-like member and an end portion of the shaft; and pressing substantially the whole of the side face of the annular projection of the shaft so that a part of the annular projection of the shaft plastically deforms and flows into the annular groove of the plate-like member, whereby the plate-like member is rigidly joined to the shaft.

DETAILED DESCRIPTION OF THE INVENTION

An example of a shaft having plate-like member joined thereto is a cam shaft.

Figure 1:
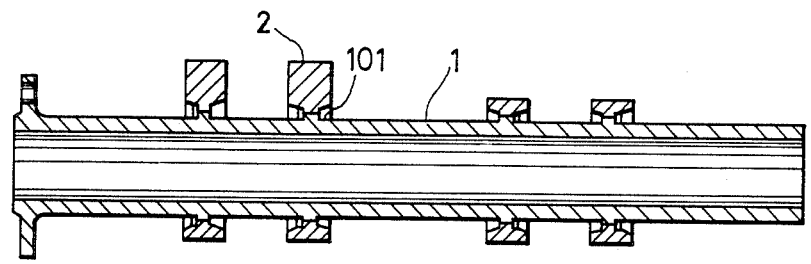
FIG. 1 is a sectional view of a cam shaft.
Figure 2:
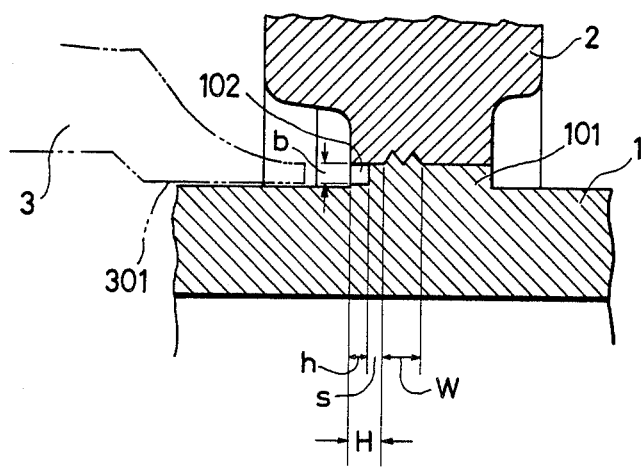
FIG. 2 is an enlarged sectional view of a part of FIG. 1.

Referring to FIGS. 1 and 2, the cam shaft produced according to the present invention is illustrated.

Briefly stated, a hollow shaft 1 is provided with a plurality of an annular projections 101, and cam pieces 2 each are fitted to the annular projections, respectively, by inserting the shaft 1 into the cam pieces 2 and pressing side portions 102 of the annular projection by a punch 3 to deform the side portion 102 whereby metal of the shaft 1 partially flows into grooves formed in the cam pieces 2 and the cams 2 are firmly joined to the shaft 1.

Figure 3:
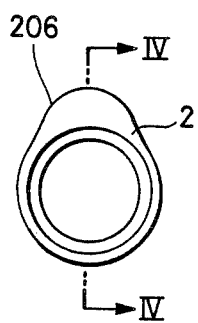
FIG. 3 is a plane view of a cam piece.
Figure 4:
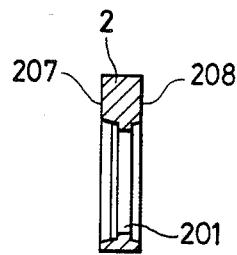
FIG. 4 is a sectional view taken along a line 4—4 of FIG. 3.
Figure 5:
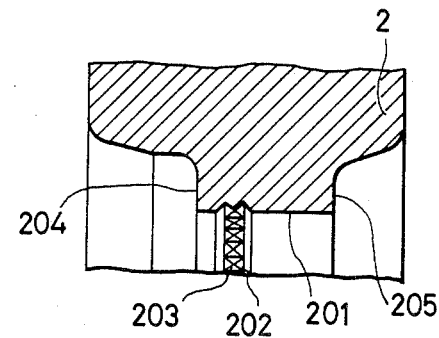
FIG. 5 is an enlarged sectional view of a part of FIG. 4.

As shown in FIGS. 3 to 5, the cam piece 2 has a hole 201 formed therein, a cam face 206 at a periphery thereof, and side faces 207, 208. In the hole 201 of the cam piece 2, two annular grooves 202 are formed. The annular grooves 202 each are V-shaped, so that the two adjacent annular grooves 202 form a W-shaped groove having a V-shaped annular projection in the central portion of the W-shaped groove. The V-shaped annular projection is made rugged by knurling it. As a whole, the annular groove 202 has a groove having a knurled surface 203. The cam piece 2 has two side faces 207, 208 each of which is perpendicular to the cam face 206 and an inner surface of the hole 201. The cam piece 2 is reduced in thickness near the hole 201, thereby to provide reduced side face portions 204, 205, which serves to reduce the weight of the cam piece 2.

The annular groove 202 is made in the inner surface of the hole 201 at a middle portion with respect to the axial direction. The reduced side face portion 204 is positioned near the groove 202.

The cam piece 2 is made of a wear-resistant and hard sintered alloy, for example, the alloy is iron base sintered alloy comprising carbide forming elements such as 1.5-3 wt %C, Cr, Mo and V. The cam piece 2 is made by forming pressurized powder body in a metal mold and then sintering the pressurized powder body in a vacuum furnace or atmosphere furnace at a temperature of 1100°-1300° C. After sintering, the sintered body is subjected to machining to form a predetermined profile and the grooves 202 and to knurling it to form the above-mentioned rugged surface 203 in the groove 202. Thus formed cam piece 2 is finished by further subjecting to heat treatment such as quenching and tempering according to the requirement for the cam piece 2.

Figure 6:
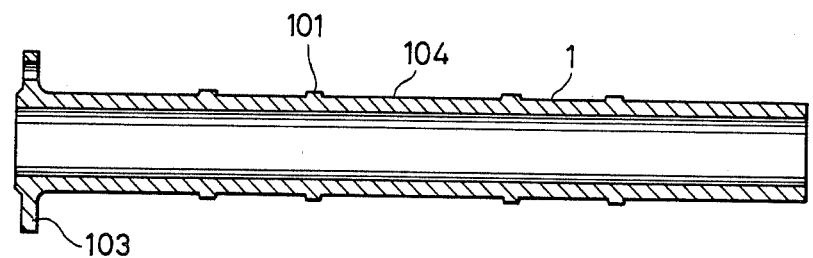
FIG. 6 is a sectional view of a shaft.

As shown in FIG. 6, the shaft 1 is hollow and has a plurality of annular projections 101 each of which is disposed at a position that the cam piece 2 is to be mounted. The shaft 1 is further provided with a flange 103 for driving the cam shaft at one end thereof, and the position of the cam pieces 2 is determined from the end of the cam shaft.

Each of the annular projections 101 is projected from the periphery 104 of the shaft 1 by 0.5-1 mm by reducing the peripheral portion 104 of the shaft 1 so that the outer diameter of the annular projection 101 will be greater than that of the periphery of the shaft 1 therearound by 1 mm-2 mm. The width of the annular projection 101 (or axial length) is substantially equal to the reduced thickness or width of the cam pieces 2. However, any dimension of the width of the projection 101 is sufficient if deformation made on one side of the projection 101 form mounting the cam piece 2 is not influenced on the opposite side.

The shaft 1 is made of material such as structural steel which is softer and more ductile than the sintered alloy for the cam piece 2.

Figure 7:
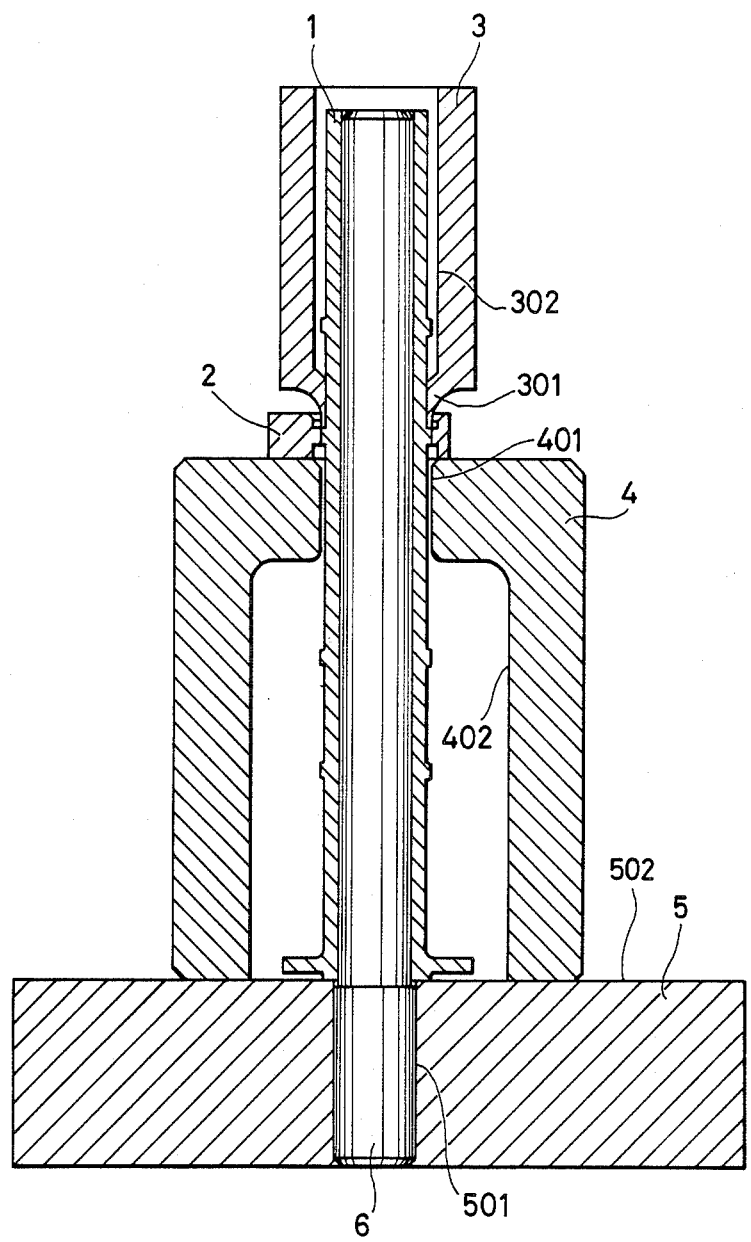
FIG. 7 is a sectional view of a cam shaft and jigs used to assemble the cam shaft, for explaining joining of the cam shaft.

Thus formed shaft 1 and cam pieces 2 are assembled using such jigs and in such a manner as illustrated in FIG. 7.

In FIG. 7, there is provided a seat plate 5 having an upper surface 502 and a through hole 501 perpendicular to the upper surface 502. A guide pin 6 is rigidly inserted in the through hole 501, so as to stand strictly perpendicularly from the upper surface 502. The shaft 1 is slidingly fitted on the guide pin 6 and rested on the upper surface 502 of the seat member 5 so that the shaft 1 is disposed perpendicularly on the upper surface 502 of the seat plate 5. A receiving block 4 is made of two separable pieces each symmetric to the other. The receiving block 4 has a through hole 401, the diameter of which is slightly larger than the diameter of the annular projections 101 of the shaft 1, and a hollow portion 402. The receiving block 4 is disposed on the upper surface 502 of the seat member 5 and the upper surface of the receiving block 4 is parallel to the upper surface 502 of the seat plate 5. The cam piece 2 is rested on the upper surface of the receiving block 4 so that the upper side 204 of the reduced side faces of the cam piece 2 substantially aligns with the upper side of the annular projection 101.

Under this conditions, the upper side of the annular projection 101 of the shaft 1 is pressed by the punch 3. The punch 3 is divided into two pieces to be separated from each other. The punch 3 has an annular punch portion 301, an annular flat end for pressing the shaft projection, and a hollow portion 302. The punch 3 is disposed so as to enclose the shaft by moving horizontally the two punch pieces from the right and left sides toward the shaft 1. The punch 3 moved laterally to enclose the shaft is driven by a driving mechanism such as a press machine (not shown) so that the annular pressing end of the punch 3 presses substantially the whole of the side of the annular projection of the shaft 1, whereby a part 102 of the annular projection 101 is plastically deformed as shown in FIG. 2 and flows into the annular groove 202 of the cam piece 2. The cam piece 2 is joined firmly to the shaft 1.

The details concerning the plastic deformation of the annular projection of the shaft 1 and cam piece 2, as shown in FIG. 2, are given as follows:

$b = (0.1-1)W$
$h = (0.8-1)b$
$S = (0-\frac{3}{4})b$
$H = S + h = (0.8-7/4)b$ wherein b denotes the width of an annular recess formed in the side of the annular projection of the shaft 1 by the punch 3;

W, the width of the annular grooves 202;

h, the depth of the annular recess 102 formed by the punch 3; and

S, the distance between the annular flat surface of the annular recess 102 and the nearest side of the annular grooves 202 made in the cam piece 2.

It is preferable that the width b of the annular recess 102 is substantially equal to or slightly smaller than the height of the annular projection 101 of the shaft 1 because the smallest projection 101 can be used for joining the cam piece 2 and the shaft 1, which is economical because an amount of reduction of the shaft 1 is small and less material can provide the necessary shaft.

Although the shaft 1 is to be provided with the plurality of cam pieces 2, the cam pieces are disposed at different positions of the shaft 1. A plurality of receiving blocks different in length are prepared. And a receiving block 4 having a length suitable to a position of a cam piece is selected for the cam piece and used as the receiving block of the cam piece 2.

The angular relative position between the cam pieces 2 is determined by a jig prepared for determining the angular position which is not disclosed because the positioning is conventional.

Figure 8:
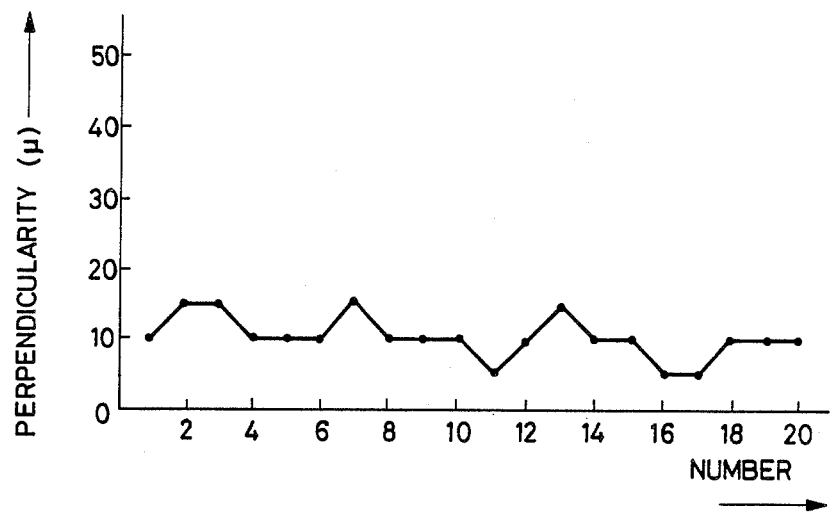
FIG. 8 is a graph showing perpendicularity of a cam shaft according to the present invention.
Figure 9:
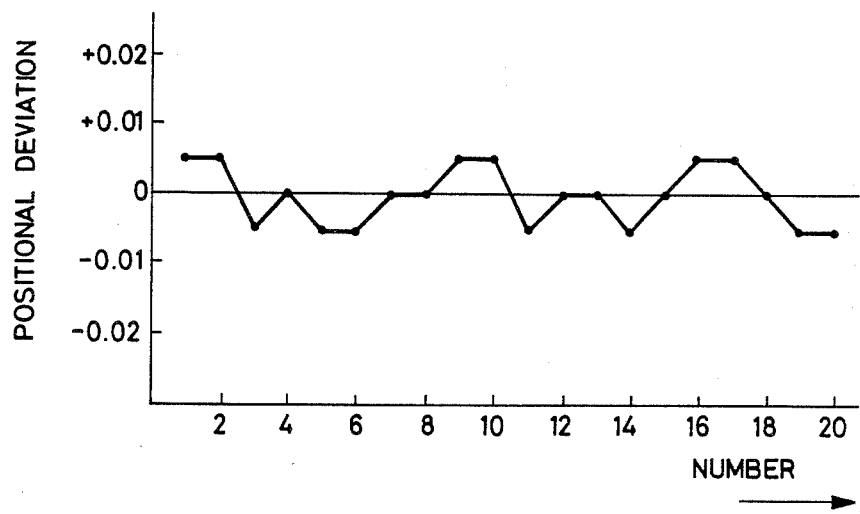
FIG. 9 is a graph showing positional deviation of the cam shaft according to the present invention.

According to this embodiment of the present invention, the axial position of each of the cam pieces 2 to the shaft 1 is very accurate because the side of the cam face which is necessary to be in an accurate position is in direct contact with the receiving block 4 and an amount of plastic deformation made on the shaft 1 is very small, which brings about a high rectangularity. FIG. 8 shows a graph, wherein the ordinate is rectangularity of the cam shaft 1 and the abscissa is the number of the cam pieces 2. The rectangularity is measured by causing an indicator to contact with the side face of the cam piece 2 mounted on the shaft 1, rotating the shaft 1 and calculating difference between the indicated maximum and minimum values. The perpendicularity is the difference expressed by unit of $\mu$. It is noted that the perpendicularity is within $15\mu$, and the value shows that the perpendicularity is very high. FIG. 9 show the deviation of the cam piece 2 mounted on the shaft 1 from a predetermined position of the cam piece 2. As it is apparent from FIG. 9, the deviation of any cam pieces mounted on a shaft 1 is within $\pm 0.005$ mm, which shows that the cam pieces are mounted on the shaft with high accuracy.

Figure 10:
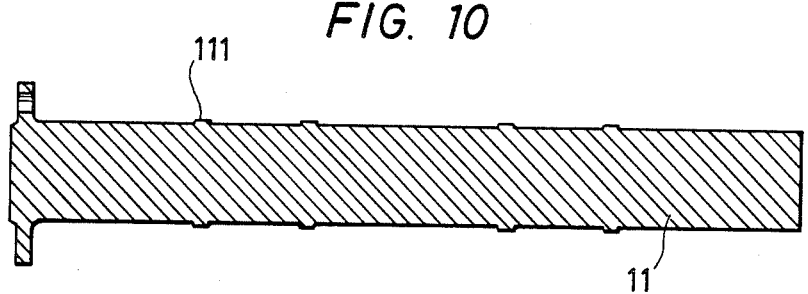
FIG. 10 is a sectional view of a solid shaft.

FIG. 10 shows an application of the present invention. Namely, a shaft 11 to which cam pieces are to be secured is solid, and having a plurality of annular projections 111 which are the same as shown in FIG. 6. The shaft 11 is directly inserted in the hole 501 of the seat plate 5 so as to strictly stand. The other assembling method is similar to the first mentioned embodiment.

Figure 11:
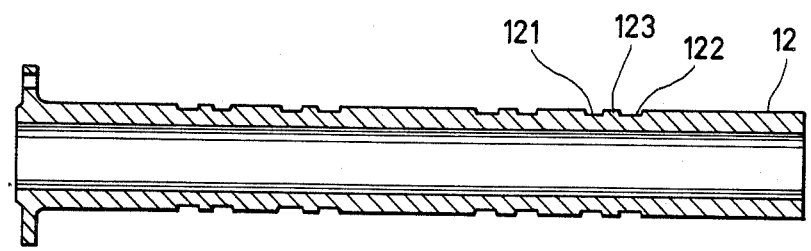
FIG. 11 is a sectional view of a hollow shaft.

FIG. 11 shows a hollow shaft 12 having a plurality of annular projections 123 formed thereon in a different manner from the first mentioned embodiment. Namely, the annular projections 123 each are formed by reducing the peripheral portions 121, 122 of the shaft 12 just around the projections 123 to be formed by machining. The joining of cam pieces to the shaft 12 is the same as the first mentioned method. This shaft 12 can make the diameter thereof larger than the shaft 1 so that the shaft 12 is made more rigid than the shaft 1.

According to the present invention, a method of producing a cam shaft is simpler than a conventional manufacturing method including brazing or diffusion welding conducted at high temperature, more unlikely for cam pieces (sintered body) to be broken and able to provide a more precise cam shaft than a conventional manufacturing method including a step of a joining a cam piece to a hollow shaft by expanding the shaft.

Further, according to the present invention, cam pieces can be joined to both a solid shaft and a hollow shaft. The method according to the present invention provides annular projections, nevertheless it is able to provide the shaft with a relatively large diameter except for just side portions of the annular projection, so that highly rigid cam shafts can be obtained.

We claim:

1. A method of producing a shaft having a member joined thereto, said member having two parallel flat first and second opposing surfaces, said method comprising the steps of:

forming a through hole in said member such that said through hole has a central axis perpendicular to said first and second parallel flat opposing surfaces of said member;

forming at least one annular groove in an inner peripheral surface of said through hole of said member, said annular groove having a rugged surface formed therein;

forming an annular projection with axial ends on the shaft at a position at which said member is to be mounted, said annular projection slightly projecting from a circumferential outer surface of said shaft and having an outer diameter which is substantially the same as or slightly smaller than the inner diameter of said through hole of said member, and forming first and second ring-shaped axial end surfaces on both axial ends of said annular projection;

inserting said shaft into said through hole of said member so that sides of said first and second axial end surface correspond to said first and second parallel flat surfaces of said member, and said first axial end surface of said annular projection is at the same level as said first parallel flat surface of said member;

supporting both one end of said shaft on the side of said second axial end surface of said annular projection and said second parallel flat surface of said member; and pressing over an entire circumference of said first axial end surface of said annular projection of said shaft in an axial direction so that part of said annular projection of said shaft flows into said annular groove of said member to be fully filled therein.

2. The method as defined in claim 1, wherein said member is made of sintered material, and said shaft is made of structural steel.

3. The method as defined in claim 2, wherein in said step of forming annular groove, two V-shaped annular grooves are formed adjacent to each other thereby to provide a W-shaped annular groove including a V-shaped annular projection therein, said V-shaped annular projection is rugged by knurling.

4. A method of producing a cam shaft comprising the steps of:

providing a plurality of cam pieces each of which comprises a cam face, a hole and first and second side faces perpendicular to a central axis of said hole;

forming at least one annular groove in an inner surface of sai hole of said each cam piece;

providing a plurality of annular projections on a shaft, the number of said annular projections corresponding to the number of said cam pieces to be mounted on said shaft, each of said annular projections slightly projecting from a circumferential surface of said shaft at an adjacent portion thereto, having an outer diameter substantially the same as or slightly less than an inner diameter of said hole of said cam piece, and first and second side faces on both sides of said annular projection;

holding one end portion of said shaft;

inserting said shaft into each of said cam pieces so that each of said annular projections faces an inner surface of the hole of said cam pieces;

supporting one side face of said each cam piece so that said annular groove of said each cam piece is substantially between said first and second side faces of said annular projection of said shaft; and pressing substantially a whole area of said side face of said each annular projection so that part of said annular projection plastically deforms to flow into said annular groove.

5. The method as defined in claim 4, wherein said cam pieces each are made of sintered material and said shaft of structural steel.

6. The method as defined in claim 5, wherein in said annular groove forming step, said annular groove is formed at a substantially central portion with respect to an axial direction of said hole of said cam piece, said each cam piece is reduced in its width around said hole so that the reduced side portion is near the end of the width of said annular.

7. The method as defined in claim 6, wherein said cam piece is supported so that said reduced side portion of said cam piece is substantially the same level as said first side face of said annular projection of said shaft.

8. The method as defined in claim 7, wherein said pressing step is conducted by a punch having an annular pressing end face and being divided into two separable pieces, and said punch presses said side face of said annular projection of said shaft through lateral and axial movements of said punch.

9. A method of producing a cam shaft, comprising the steps of:

preparing a shaft having a circular cross-section;

forming annular projections on said shaft at the positions to which cam pieces are to be mounted, each of said annular projections, coaxially projecting from a circumferential surface of said shaft by a predetermined height so that the outer diameter of said each annular projection is larger than the circumferential surface of said shaft immediately adjacent to said annular projection, and having side faces spaced from each other by a width of said annular projection;

preparing cam pieces to be mounted on said annular projections of said shaft, each of said cam pieces having a cam face at a circumferential portion thereof, a through hole, said faces one of which is perpendicular both to said cam face and to said through hole;

forming at least one annular groove on the inner surface of said through hole at a position inside one of said side faces of said cam piece, said annular groove having a rugged surface therein;

preparing a seat plate having an upper surface and a hole a central axis of which is perpendicular to said upper surface of said seat plate;

supporting said shaft by said seat plate so as to be perpendicular to said upper surface of said seat plate;

preparing receiving blocks the number of which corresponds to the number of said cam pieces to be mounted, said respective receiving blocks having height equal to respective distances of said cam pieces from said upper surface of said seat plate, each of said receiving blocks having a hole the diameter of which is larger than the diameter of said shaft immediately adjacent to said annular projections, and hollow portion, and being divided into two separate pieces;

disposing one of said receiving block on said seat plate so as to surround said shaft;

fitting one of said cam pieces on one of said annular projections of said shaft and resting said cam pieces on said receiving block;

preparing a punch having an annular pressing face at one end and being divided into two separable pieces;

pressing one side of said annular projection fitted with said cam piece to be mounted to plastically deform said one side, whereby part of said annular projection flows into said annular groove of said cam piece, and repeating said disposing step, said fitting step, and said pressing step with respect to the other each cam piece until all of said cam pieces are mounted on said shaft.

10. The method as defined in claim 8, wherein said annular projections each are formed by reducing the circumferential surface adjacent to said annular projections.

11. The method as defined in claim 9, wherein said shaft is hollow and supported by a guide pin rigidly inserted in said hole of said seat plate.

* * * * *

UNITED STATES PATENT AND TRADEMARK OFFICE
CERTIFICATE OF CORRECTION

PATENT NO. : 4,783,898

DATED : November 15, 1988

INVENTOR(S) : Hisanobu Kanamaru and Yoshimi Sugaya

It is certified that error appears in the above-identified patent and that said Letters Patent is hereby corrected as shown below:

On the title page,
Item [73] Assignee: add the following -- and, Hitachi Powdered Metals Co., Ltd., Chiba, Japan--.

Signed and Sealed this

Twelfth Day of December, 1989

Attest:

JEFFREY M. SAMUELS

*Attesting Officer*  *Acting Commissioner of Patents and Trademarks*